INVENTORS
MAURO COMASTRI
VALENTINO WIQUEL
BY
Emmett F. Salter
ATTORNEY

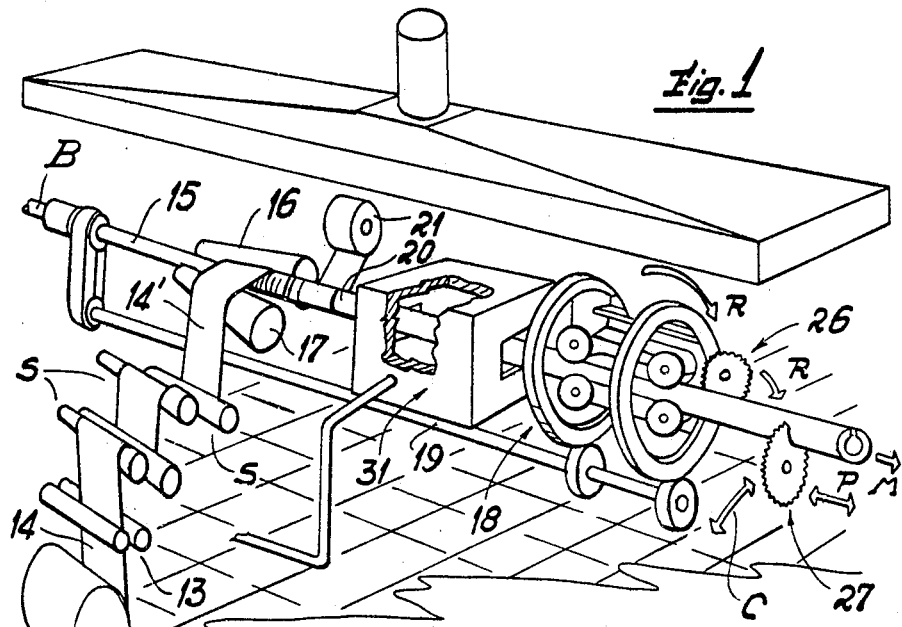
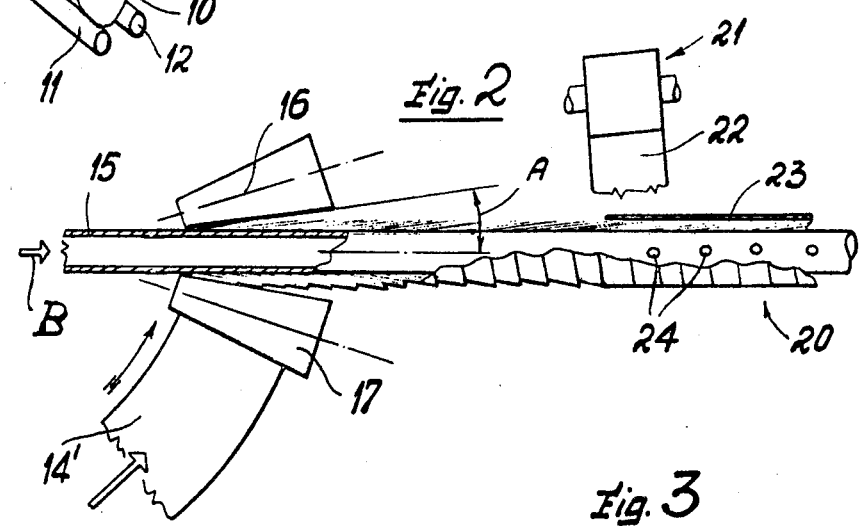
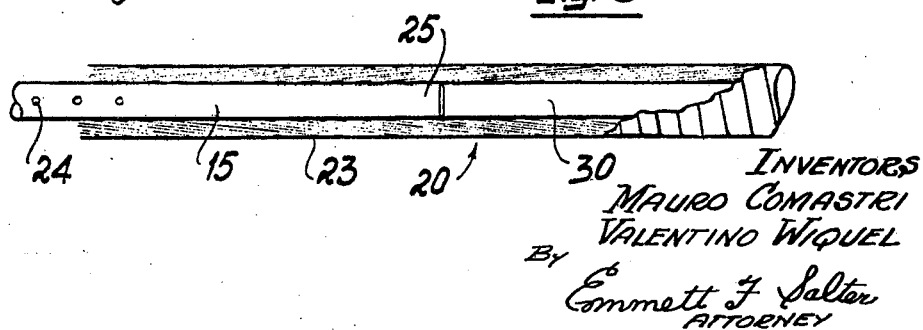

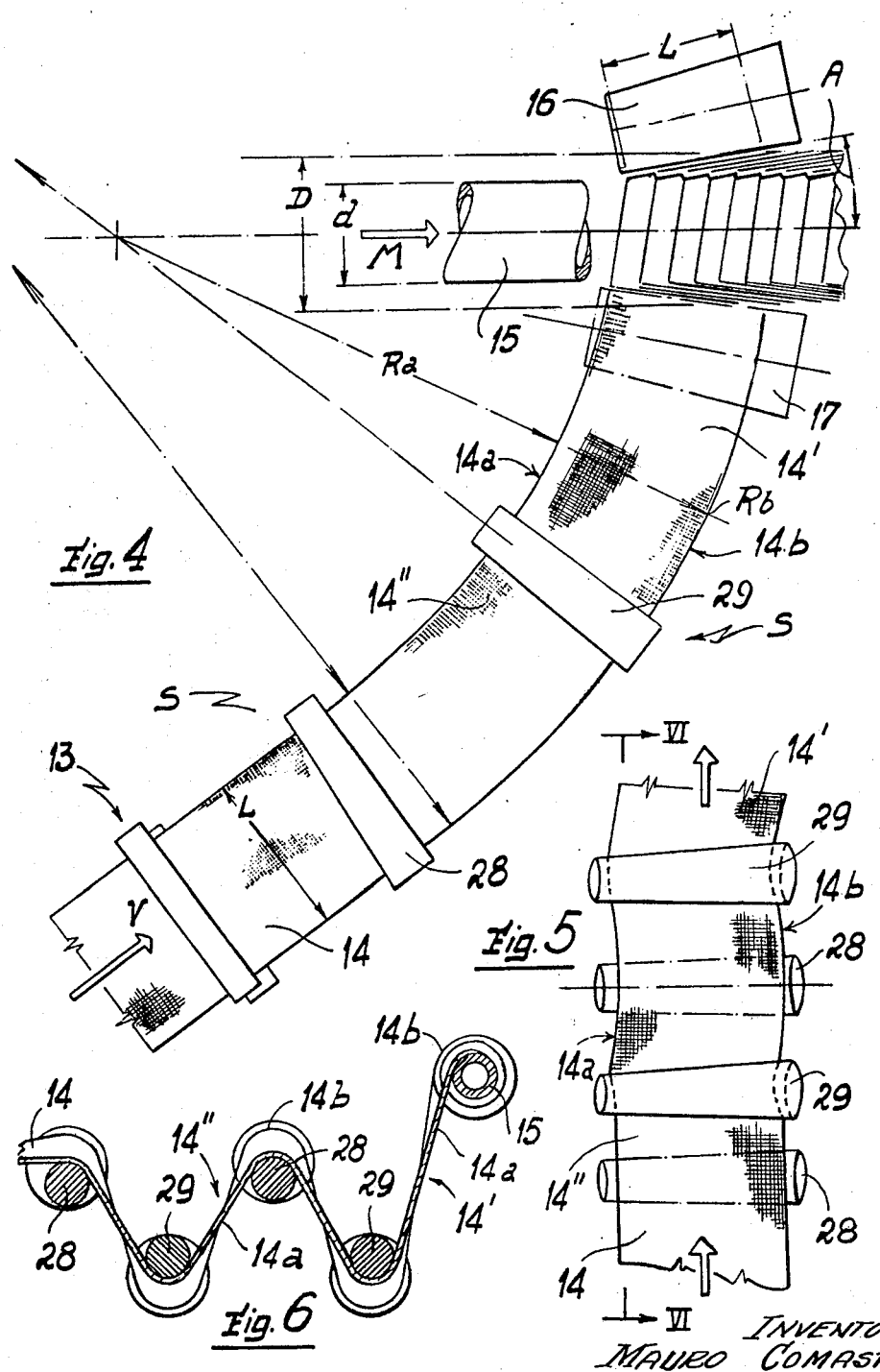

United States Patent Office 3,498,862
Patented Mar. 3, 1970

3,498,862
METHOD AND APPARATUS FOR MAKING TUBULAR FIBROUS INSULATING MATERIAL
Mauro Comastri and Valentino Wiquel, Milan, Italy, assignors to Vetreria Italiana Balzaretti Modifliani S.p.A., a corporation of Italy
Filed Sept. 1, 1966, Ser. No. 576,586
Claims priority, application Italy, Sept. 8, 1965, 19,989/65; June 22, 1966, 14,293/66
Int. Cl. B31f 1/00
U.S. Cl. 156—195        25 Claims

ABSTRACT OF THE DISCLOSURE

The continuous production of cylindrical tubing from a strip of mineral fibers of substantially uniform width and thickness by longitudinally stretching the strip differentially across the width thereof, helically winding the distorted strip onto a rotary mandrel to lay up the strip in successive coils with the portion of the strip adjacent to the shorter edge in contact with the mandrel and the portion of the strip adjacent to the longer edge in overlapping relation to the next preceding coil, while axially withdrawing the formed cylindrical tubing from the mandrel. The inclusion of a heat-settable thermoplastic binding agent in the mass of fibers makes possible the activation thereof in the course of the formation of the cylindrical tubing on the mandrel by blowing a heated gas through apertures in the mandrel for passage through the overlapping coils of the tubing. A protective impervious covering may be wound around the outer periphery of the helical turns of the cylindrical tubing as the same is pulled long the forming mandrel, and thereafter suitable cutting mechanisms may be provided for optionally slitting the tubing longitudinally and cutting it transversely into desired lengths.

---

This invention relates to the manufacture of tubular fibrous material for pipe insulating purposes and the like and, more particularly, it is concerned with the continuous manufacture of tubular material consisting of an essentially coherent structure of fiberglass or other mineral fibers, said tubular material being usually, but not necessarily, designed for providing insulating covering elements for pipes for ducts for air conditioning systems.

This invention is further concerned with an apparatus designed for continuously producing said tubular insulating material, and with the improved article produced thereby.

Prior art methods of producing fibrous insulating materials and articles of the character referred to above include both non-continuous and continuous procedures. The former mode of production results in the manufacture of stock material of undesirable reduced length which results in substantial waste since said stocks require trimming to provide neatly cut end-portions. Further disadvantages of non-continuous production are well known to those skilled in the art.

Continuous modes of production which were proposed heretofore include the provision of a continuous mat of fibrous material in strip form, said strip being of a width nearly corresponding to the outer circumferential dimension of the tubular material to be produced, and of a thickness nearly corresponding to the thickness of said material, that is, to the difference between the inner and outer radii thereof. This strip is fed lengthwise adjacent to a mandrel, and is bent transversely around said mandrel until its opposite edges contact with each other, at which time the edges are joined together. When the production of tubular material consisting of two or more coaxial superimposed fibrous layers has been undertaken, the mode of procedure outlined above presented several problems, especially when it is desired to provide tubular articles having a substantially high ratio $D/d$, where $D$ and $d$ represent, respectively, the outer and inner diameters of the tubular article. Further, this method results intrinsically in defective material as the longitudinal junction of the tubular article provides a serious irregularity in its circumferential structure; the transverse bending of a fairly thick fibrous mat gives rise to severe stresses in its fibrous structure, in particular at the innermost and outermost portions thereof; an undesirable percentage of broken fibers occurs, and the like.

The principal object of this invention is to provide a new and improved method which overcomes the heretofore noted and other disadvantages.

It is a further object of this invention to provide an improved method for continuously producing tubular fibrous insulating articles without deleteriously affecting their homogeneity and other physical and structural properties, irrespective of the inner and outer dimensions thereof or the density of the fibrous structure.

Another object of this invention is to provide a new method which may be readily adapted to the manufacture of fibrous insulating material of widely different dimensions, density and other physical characteristics, to meet the most diverse requirements of the service to which the insulation may be put.

A still further object of this invention is to provide an improved method of manufacturing tubular fibrous insulating material wherein the density and other physical characteristics thereof may be varied in the thickness of the material.

A still other object of this invention is to provide a new advantageous apparatus adapted to the continuous production of said material according to said method.

A further object of this invention is to provide an improved fibrous insulating material in the form of cylindrical tubing having a substantially homogeneous fibrous structure along the length thereof, and wherefrom cylindrical and semi-cylindrical sections of thermal insulation may be cut economically without waste.

Broadly, according to the instant invention, a fibrous mat strip having a predetermined width and thickness is fed continuously in a longitudinal direction while being subjected to a differential drawing action in a transverse direction which results in a substantial bending of said strip laterally and a consequent substantial elongation of one edge with respect to the other edge thereof. This laterally curved strip is guided ot a rotary mandrel and is helically wound therearound to define the inner surface of the hollow cylindrical tube which is produced. When the thickness of the insulating material is low with respect to the inner diameter, the winding can be effected with a single strip and it is advantageous to have the pitch of the helical coil assumed by the wound strip not greater than half of the width of said strip whereby at least half of the width of the wound strip in each helical coil will overlap the adjacently coiled strip portion, the overlapping side portion of the coiled material including the elongated edge thereof. The helically wound strip material thus formed is therefore caused to assume, at any portion thereof, a substantially frusto-conical configuration, wherein the smaller base of the said cone is defined by the cross-sectional area of the mandrel and the larger base of the cone is defined by said elongated edge of the wound strip, disposed externally of the helically wound material. The spirally wound tube is continuously advanced along the axis of the mandrel, is suitably processed, and is delivered beyond said mandrel for cutting tubular sections therefrom.

As a result of the differential drawing action imposed on the strip, it will be curved in its own plane, the radius of curvature being suitably selected so that ratio of the lengths of its inner and outer edges will conform to the ratio of inner and outer diameters of the cylindrical tube being produced, that is, the ratio of the diameters of the co-axial inner and outer helical coils formed by said edges, which are disposed respectively at the inner and outer surfaces of the cylindrical tube.

While the overlapping of successive coils has been indicated as critically not less than half the width of the strip, it is evident that said overlapping could be, and generally is, greater, and spans over the major part of the strip width. Therefore, the thickness of the tubular material will correspond to at least two and generally to a greater multiple of the individual thicknesses of the strip.

To provide the desired frusto-conical winding of the fibrous strip, the strip is guided to the mandrel tangentially at a suitable inclination with respect to the axis of the mandrel, corresponding to the angle defined by the said frusto-conical configuration of the coiled strip. Such inclination is defined by the expression $$\tan A = \frac{(D-d)}{\sqrt{4L^2-(D-d)^2}}$$

wherein "tan A" is the tangent of the angle "A" between the strip and the axis of the mandrel, and "D" and "d" are the outer and inner diameters of the cylindrical tube, respectively, and "L" is the width of the strip.

The differential drawing of the strip is produced advantageously by advancing the original straight fibrous strip around and in circumferential relationship with one or a plurality of conical rollers whereby one edge of the strip is caused to follow a path longer than the path followed by the opposite edge, the conicity and the number of said rollers being chosen in accordance with the extent of the desired sideward deformation of the strip. When the thickness of the insulating material must be great, it is impossible to obtain a sufficient differential drawing action without tearing the strip, and several superimposed strips must be provided. All characteristics mentioned above may be applied to each strip.

Further, the method preferably comprises the step of applying a covering strip about the helically wound material, said covering strip being adapted to impart a substantially cylindrical outer surface to the material. According to a most desirable embodiment of the invention, the helically wound material is subjected to a radial pressure applied to its outer surface, defined by the elongated edges of the helically and conically wound strip, prior to and/or concurrently with the winding of said covering strip thereabout.

Still further, the method preferably contemplates the obtention of self-sustaining and cohesive properties for the fibrous tubing in accordance with the invention, by means of thermoplastic agents suitably dispersed in the fibrous material, which are activated and set by forcing a heated gaseous medium through the tubular material as wound, preferably about an apertured tubular mandrel, said heated medium being forcibly supplied within the apertured tubular mandrel, and then caused to permeate and traverse the fibrous material wound about the mandrel.

According to the instant invention, the gaseous heated medium is under sufficient pressure to cause the wound tubular material to be slightly separated from the mandrel, especially in the zone in which the apertures are located, while causing setting of the binding agent, so that it is possible to exert a continuous traction on the tubular material to draw it away from the mandrel more easily by any appropriate means.

Additional objects, features and advantages of the present invention will become apparent to those skilled in the art to which this invention appertains, from the following detailed description and the accompanying drawings, forming an essential component of this disclosure, and on which, by way of example, only preferred embodiments of this invention are illustrated.

In the drawings:

FIG. 1 is a perspective diagrammatical view of a complete apparatus according to the invention;

FIGS. 2 and 3 illustrate diagrammatically, partly in longitudinal section and partly in front elevation, the fibrous strip material being helically wound on the mandrel, covered thereon and delivered therefrom;

Figure 7:
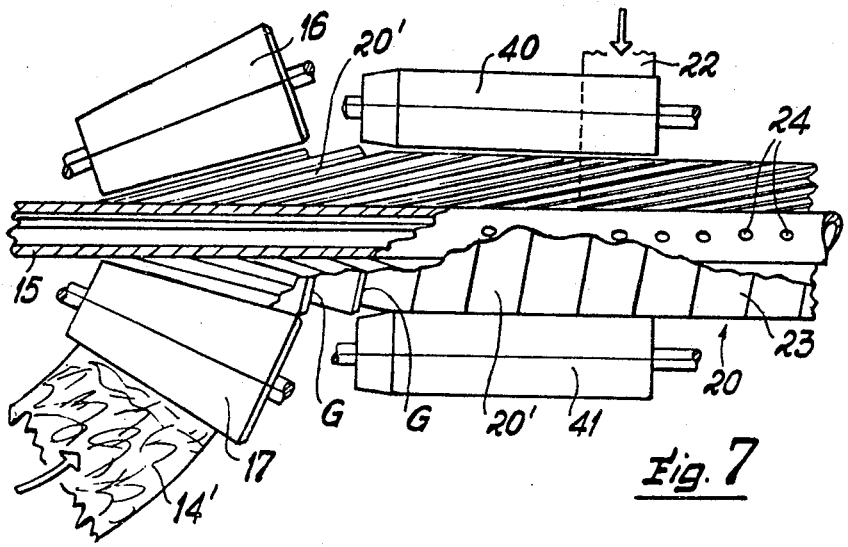
Figure 9:
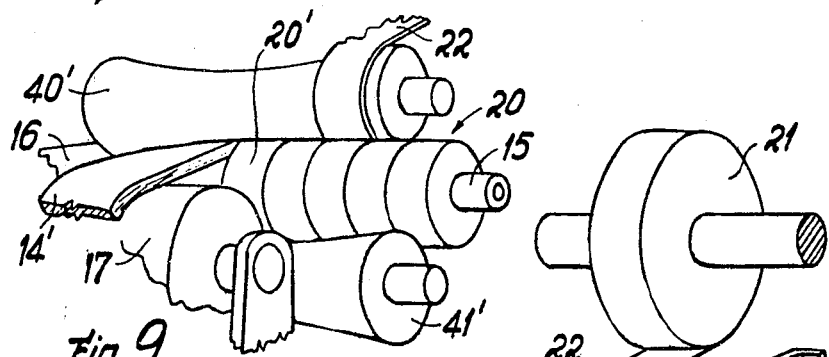
Figure 8:
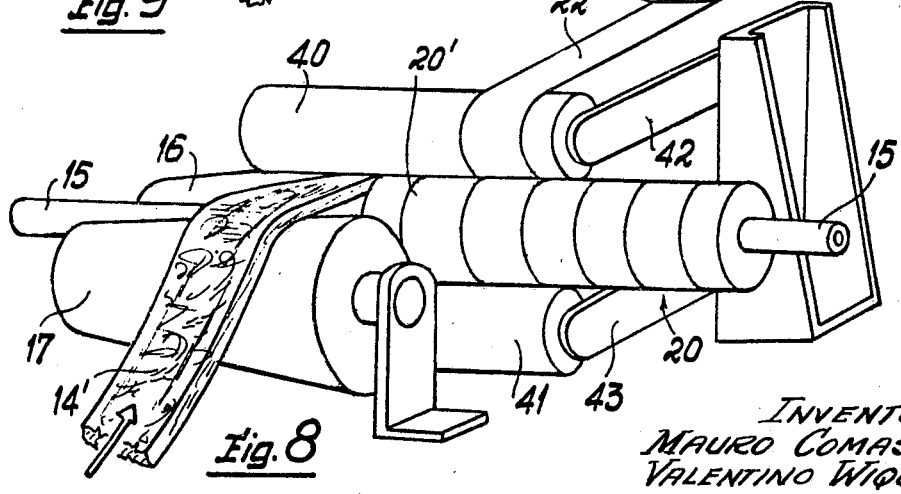

FIG. 4 diagrammatically illustrates the essential steps and means for differentially drawing the strip material and helically winding the same in substantially frusto-conical configuration;

FIG. 5 is a simplified plan view of the differential drawing means;

FIG. 6 is a vertical sectional view along line VI—VI of FIG. 5;

FIG. 7 is partly a sectional view and partly a front elevation of a modified embodiment of the fibrous strip winding sub-assembly;

FIG. 8 is a perspective view of another embodiment of the same sub-assembly; and FIG. 9 is a perspective fragmentary view of still another embodiment of the same sub-assembly.

Referring now to the drawings, wherein like reference numerals refer to like or equivalent parts and components throughout the several figures, and wherein purely structural details and ancillary devices have been omitted, as appertaining to current knowledge and/or easily conceivable by those skilled in the art, FIG. 1 shows a layout in accordance with the instant invention. It comprises a continuous supply of fibrous material in strip form, which may be a mat of glass fibers, wound on a bobbin or reel 10 rotatably supported on bearing rollers 11 and 12, for example. The reel 10 is positioned ahead of a pair of calendering rollers 13 through which the mat 14 in straight strip form is delivered to the drawing sub-assembly for differentially stretching the mat across the width thereof. This assembly includes rollers generally indicated at S, and discussed in detail below. The strip is treated with a heat-settable thermoplastic binding agent at some point before it reaches the mandrel if the strip on the reel has not been conditioned therewith before reeling thereon. Suitable binding agents may be of the types disclosed in the patent to Leveque et al., No. 3,007,813 granted Nov. 7, 1961, and the patent to Stalego, No. 3,002,857, granted Oct. 3, 1961. The differentially drawn strip, indicated at 14, is fed around a hollow cylindrical mandrel 15 by conical guide rollers 16 and 17. The mandrel is perforated and is connected at its end portion B, ahead of the location at which the strip is applied thereto, to a source (not shown), of a pressurized and heated gaseous medium. The mandrel 15 is further conected to a mechanism (not shown), for imparting rotary motion thereto.

A known drawing device, generally indicated at 18, is positioned beyond the strip winding station and is supported and driven for concurrent rotation with mandrel 15 in the direction indicated by arrow R. This is effected by a suitable mechanical transmission including a shaft 19, for example, and adapted for progressively displacing the formed tubular material along and off the mandrel, and delivering the formed tube for longitudinal slitting by cutting means 26, and for transverse cutting by means 27, which serve to cut the tube longitudinally and transversely to derive the desired article of manufacture, namely, pipe insulating coverings. The cutting means 26 and 27 are supported for concurrent rotation with the mandrel as indicated by the arrow R. Also, the cutting disc 27 is capable of longitudinal to-and-fro movement as well as transverse to-and-fro movement as indicated by arrows P and C, respectively, to enable lengths of the formed tube to be severed squarely as the tube is removed from the mandrel in the direction indicated by arrow M.

Means for winding a covering strip 22 supplied by a reel 21 is positioned beyond but adjacent to the strip winding means 16 and 17. An oven 31, or other suitable heat processing device, is positioned beyond the covering station for heat-processing the tubular material and for setting the binder therein, prior to the delivery thereof to the advancing and severing means.

Therefore, in its broadest aspect, the method according to the present invention comprises the steps of continuously supplying a fibrous mat 14, having a settable binding agent dispersed therein, in straight strip form and of predetermined uniform thickness and width, and subjecting said strip to differential drawing by a device generally indicated at S. This causes differential elongation of its edge portions and imparts a consequent curved configuration in the plane of the strip. This shaping of the strip is followed by feeding the differentially drawn strip 14′ to a rotary perforated mandrel 15, winding the strip thereon at a predetermined inclination with respect to the axis of the mandrel, and advancing the wound strip along the mandrel (by means of a drawing device generally indicated at 18), whereby said strip is laid up helically along the mandrel.

The feeding of the strip and the advance of helical tube formed on the mandrel is so arranged that the most elongated edge portion of the strip is located in the direction of movement of the helical wound tube. The rotational speed of the mandrel and the linear speed of the advance of the formed tube are such that the winding develops a coil having a helical pitch not greater than half of the width of the strip, whereby the most elongated edge portion of the wound strip will overlap the opposite shorter edge portion of the strip in the adjacent preceding turn of the coiled strip. The winding of the strip on the mandrel is followed by processing the wound strip to set the binding agent to impart coherency to the wound tubular fibrous structure thus formed about the mandrel, especially in the zone where the perforations are located, and axially delivering the tube off the mandrel.

Preferably, the method comprises further the winding of a complementary strip of material about the helically wound fibrous strip prior to the complete and final setting of the binding agent.

More particularly, the method comprises further applying a pressure to the outer surface of said helically wound strip, concurrently with the helical covering of the same with said complementary strip of material.

The preferred modes of executing the above-mentioned steps of the process and the essential components of the means designed for such execution will now be described in detail with reference to FIGS. 2 to 9.

DIFFERENTIAL DRAWING SUB-ASSEMBLY AND METHOD

Referring now to FIGS. 4 to 6 inclusive, assuming that a fibrous cylindrical tube having a predetermined outer diameter D and a predetermined inner diameter $d$ is to be produced around a mandrel 15 having obviously the diameter $d$ as its outer diameter, the thickness of the drawn strip material 14′ is to be taken into account. This factor is essential in determining the number of superimposed layers that are necessary to build up the desired thickness of the finished tubular article, this thickness being obviously $$\frac{D-d}{2}.$$

and representing the extent of overlapping of the turns of the helically wound strip. The width L of the strip is further to be taken into account for adjusting the inclination A of each layer of the wound strip, to provide the extent of said overlapping and the relation between rotational speed of the mandrel and linear speed of advance of the wound material therealong. It will be evident that in consequence of the above critical spiral winding of the strip, the leading or forward edge 14b thereof, (FIG. 4), will actually define a helical cylindrical coil of diameter D, while the trailing or rear edge 14a of the material will form a helical coil adjacent to said mandrel and therefore of diameter $d$.

While a slight and even a substantial deformation of the fibrous strip material would be possible and sometimes desired in the very winding of same about the mandrel, the above values are to be assumed as the parameters of the differential drawing of the straight calendered strip material 14. Such differential drawing causes an elongation of the forward edge 14b of the strip so that the ratio between the actual lengths of the opposite edges 14b and 14a of the strip will be of the order of the ratio between the outer and inner diameters of the tubular article to be produced, that is nearly $$\frac{\text{length of } 14b}{\text{length of } 14a} = \frac{D}{d}$$

This condition will be satisfied if the strip 14 will be so drawn as to be laterally curved as shown at 14′ in FIG. 4. In particular, this relationship will be attained if the radius $Rb$ of its outer edge 14b will be related to the radius $Ra$ of inner edge 14a as the diameter D is related to diameter $d$.

Such differential drawing and consequent lateral curvature of the strip is attained by advancing the strip material 14 in tangentially contacting relationship with a plurality of pairs of conical rollers 28 and 29, having their larger sections on the side of the strip which is to be elongated. The arrangement and the operation of the differential drawing device is readily understood from a consideration of FIGS. 4 to 6, wherein a partially drawn strip portion is indicated at 14″. This drawing action is realized by the fact that the edge 14b of the strip is caused to pass around the conical rollers 28 and 29 in a path longer than the path followed by the opposite edge 14a.

In the drawings, two pairs of conical rollers 28 and 29 have been shown for purposes of simplicity, and these rollers are shown as having a substantial conicity. However, it has been proved advantageous to actually provide the differential drawing sub-assembly with a substantial number of conical rollers, each having a very small conicity. Such an arrangement has several advantages; for example, the fibrous strip is subjected to a very gradual adaptation of its fibrous structure to differential elongation; the apparatus is readily adapted to the most variable requirements by simply passing the strip along and around only a limited number of the rollers, according to the desired extent of the differential elongation, etc. It is also possible, in order to obtain a progressive action, to have several pairs of conical rollers, each pair having a different conicity.

While in FIG. 4 the strip material and the conical rollers have been shown in "plane development" of the sub-assembly, it is evident that the rollers may be actually arranged perpendicularly to the general direction of advance of the strip material, as shown in FIGS. 1, 5 and 6, for example. In addition, the rollers or a limited number of them may be driven by means of conventional motor and transmission means (not shown), to facilitate the advance of the material thereabout.

In addition, a further precise adjustment of the differential drawing may be provided by adjusting the lateral inclination of the axis of one or more of the rollers, to consequentially adjust the difference of the paths to be followed by the opposite edge portions of the strip material.

STRIP WINDING AND COATING SUB-ASSEMBLY AND METHOD

These important features of the invention, together with the essential elements for setting the tubular article being formed, will now be described with reference to FIGS. 2 to 4 and 7 to 9, wherein 20 generally indicates the wound and covered cylindrical tube, 20' (FIGS. 7 to 9) the wound but still uncovered tube, 23 (FIGS. 2 and 7) the spiral covering, and 30 the hollow interior of the article, as the same is withdrawn from the end portion 25 of the mandrel 15.

The differentially drawn fibrous strip material 14' is fed to the hollow mandrel 15 and is wound therearound by at least one, and preferably a plurality of conical rollers, such as diametrally opposed rollers 16 and 17. The conicity of these rollers and the inclination of the axes thereof with respect to the axis of mandrel 15, are calculated and adjusted to provide, at any location of the outer surface of said rollers, a peripheral speed nearly corresponding to the actual linear speed of the part of the strip material which is advanced in contacting relationship with the corresponding area of the rollers, and respectively to provide the desired angle A at the part of the rollers wherein said contacting relationship occurs. The amount of overlapping of adjacent turns of the wound strip material is determined by the relation between the velocity V (FIG. 4) at which the strip material is continuously supplied and the velocity M (FIG. 4) at which the wound material being formed and processed is axially advanced along and off the mandrel 15. The rotational speed of the mandrel is so adjusted that its peripheral speed will correspond to or be slightly greater than the linear speed of the shorter trailing edge 14a of the strip.

No further consideration of the above assumption is believed to be necessary for understanding the invention, as such adaptations and adjustments may be easily calculated and verified by proper experimentation, taking into account the density, deformation and other physical characteristics of the fibrous strip material being handled.

The inner surface of the tubular material, that is, its hollow interior 30 (FIG. 3), is formed by the contact of the material with the mandrel 15. The inner or trailing edge 14a of the strip will be flattened by the very winding of the material about the mandrel. However, the outer surface of the cylindrical tube acquires a helically stepped configuration, such as purposely shown in FIG. 7 on an exaggerated scale. Smoothing out of this stepped surface is therefore preferred, together with a suitable compacting of the outer portion of the tubular material. Such mechanical processing of the wound tube may be provided by binding the outer surface thereof with the cover strip 22 and/or by exerting a suitable radial pressure on this surface.

According to FIG. 7, roller means 40 and 41, preferably in diametrally opposite locations, are provided for exerting this pressure and to flatten the stepped surface of the wound tube. One of these rollers, for example roller 40, may be used for feeding the cover strip 22 to and around the tube, so that the binding thereof will maintain the tube in the desired constrained condition resulting from the action of these rollers. In the arrangement shown in FIG. 7, the rollers 40 and 41 are provided at their rear end portions with frusto-conical or otherwise tapered surfaces to facilitate the feed of the externally stepped wound material thereunder.

The rollers 40 and 41 may be rotatably supported on brackets 42 and 43, respectively (FIG. 8), which in turn are pivotally supported on a suitable frame, these rollers being suitably urged by spring means or weights (not shown), to apply the desired radial pressure on the wound cylindrical tube. Furthermore, in the arrangement shown in FIG. 8, these rollers are shown as being adjustable lengthwise of the mandrel so that the action thereof is exerted simultaneously with the very winding of the strip 14' about the mandrel, that is, the stepped outer surface of the helically wound cylindrical tube is smoothed or flattened simultaneously with the formation thereof.

The pressing rollers 40 and 41 may be supported for rotation about axes generally parallel to the axis of mandrel 15, but such an arrangement gives rise to a certain resistance to the axial advance of the wound fibrous tube being produced. When a slight radial pressure is applied by these rollers to the outer surface of the tube, this resistance is eliminated, and an arrangement such as shown in FIG. 8 may be used advantageously.

However, the rollers 40, 41 may be supported obliquely with respect to the mandrel, the axes of rollers and of mandrel forming therebetween an angle which may be greater than the inclination of the spiral defined by the coil on the outer surface of the wound tube, so that a component corresponding to the advance of the material is developed at the areas where these rollers and the outer surface of the tube engage in frictional contact. According to a preferred embodiment of the subassembly, these rollers are each provided with a concave outer surface, in particular a paraboloidal surface, so that the area of contact between the rollers and the wound tube can be materially extended lengthwise of the tube. Such a preferred arrangement is diagrammatically shown in FIG. 9, wherein the thus supported and shaped pressing rollers are indicated at 40' and 41', respectively.

Referring to FIGS. 2 and 3, there is shown the tubular mandrel 15 which may be fed at the rear end B with a pressurized gaseous heating medium, and which is provided with a plurality of perforations 24 arranged uniformly therealong at a portion thereof beyond the location at which the strip material is fed thereto and wound therearound (FIG. 2), and preferably also beyond the location at which the cover 23 is formed by winding the complementary cover strip 22 about the wound strip material.

The heating medium, which issues from the openings 24 of the mandrel, permeates the fibrous material throughout the thickness thereof to set the binder agent. The cover 23 may be made, if desired or expedient, of an impervious or substantially gas-impervious sheet material, such as plastic strip, for example, so that the gaseous medium issuing from openings 24 is caused to travel lengthwise of the fibrous tube for full and even heat-exchange with the impregnated fibers to attain a uniform setting of the binder therein.

The use of plastic sheet material, or other suitable impervious and substantially resistant material for forming outer covering 23, results in the production of a very advantageous article of manufacture, that is, a fibrous tube of insulating material having a uniform protective and impervious outer surface layer, and therefore an excellent product from which insulating pipe covering articles may be produced. Such articles having an outer covering layer do not require any separate additional protective means, as is sometimes the case in the art of pipe insulation.

From the above description, it will be readily apparent to those skilled in the art that the invention provides a new and advantageous method for continuously producing a fibrous tubular article, consisting of a fiber glass bonded mat structure or equivalent fibrous structure; that said method may be advantageously executed irrespective of the length, the inner diameter, the outer diameter and the ratio between these diameters of the article being produced; that said method results in the manufacture of an improved fibrous tubular article having a uniform coherent structure throughout the body thereof with no irregularities along its length or transverse sections; that said article of manufacture may be further improved by imparting any desirable density to its fibrous structure, either evenly throughout the thickness thereof or by modifying the density at its outer layer or portions, if desired or expedient; and/or by forming the article with an outer covering which may or may not have an impervious outer layer or layers; and that the invention further provides a new and advantageous apparatus and means designed to continuously produce a tubular fibrous article of manufacture of the character described, and having any of the above new, improved and advantageous features.

We claim:

1. The method of continuously producing cylindrical tubing from a strip of mineral fibers of substantially uniform width and thickness, which comprises,
  (a) differentially drawing the strip of fibers across the width thereof in the course of its travel towards a rotary mandrel to elongate one edge portion of the strip with respect to the opposite edge portion thereof,
  (b) helically winding the differentially drawn strip on the rotary mandrel while the wound spirals of the strip are advanced along the axis of the mandrel to lay up the successive spirals of the strip onto the preceding ones in overlapping relation, and
  (c) axially removing the formed cylindrical tubing from the mandrel.

2. The method set forth in claim 1 wherein the strip of mineral fibers is permeated with a thermo-settable binding agent, including the step of heating the wound strip prior to the delivery of the cylindrical tubing from the mandrel to effect a setting of the binding agent.

3. The method set forth in claim 2 wherein the rotary mandrel is hollow and perforated, and feeding a heated gaseous medium under pressure to the interior of the mandrel to effect the setting of the binding agent while simultaneously separating slightly the internal surface of the tubing from the external surface of the mandrel to facilitate the longitudinal drawing of the tubing therealong.

4. The method set forth in claim 1, including the step of radially pressing the outer surface of the helical spirals of the fibrous strip for imparting a cylindrical contour to said surface.

5. The method set forth in claim 4 wherein the radial pressing of the outer surface of the helical spiral is executed simultaneously with the helical winding of the differentially drawn strip.

6. The method set forth in claim 1 including the step of helically winding a strip of covering material around the external edges of the helical spirals of the fibrous strip following the helical winding of the latter.

7. The method set forth in claim 1 including the steps of radially pressing the outer surface of the helical spirals of the fibrous strip for imparting a cylindrical contour to said surface and helically winding a strip of covering material around the external edges of the helical spirals of the fiber strip.

8. The method set forth in claim 7 wherein the helical winding of the strip of covering material and the radial pressing of the outer surface of the helical spirals are executed simultaneously.

9. The method set forth in claim 2 wherein the rotary mandrel is hollow and perforated, and including the steps of helically winding a strip of gas-impervious covering material around the external edges of the helical spirals of the fibrous strip following the helical winding of the latter, and feeding a heated gaseous medium under pressure to the interior of the mandrel to permeate the entire thickness of the tubing to cause the setting of the binding agent while simultaneously separating slightly the internal surface of the tubing from the external surface of the mandrel to facilitate the longitudinal drawing of the tubing therealong.

10. The method set forth in claim 1 wherein each successive spiral of the differentially drawn strip overlaps at least half of the preceding spiral.

11. The method set forth in claim 10 wherein a plurality of strips of the fibers are wound in a plurality of layers on the rotary mandrel.

12. The method set forth in claim 1 wherein the differential drawing of the strip of fibers is executed by feeding one edge portion of the strip along a longer path than that traversed by the opposite edge portion of the strip in the course of its travel to the rotary mandrel.

13. The method set forth in claim 12 wherein the strip of fibers travels past conically shaped rolls having the portions of larger cross-section in contact with the one edge portion which traverses the longer path.

14. The method set forth in claim 13 wherein the traverse of the strip of fibers past the conically shaped rolls is executed in a plurality of stages to attain a progressive elongation of said one edge portion.

15. The method set forth in claim 1 wherein the differentially drawn strip is guided to the mandrel at an inclination relative to the axis thereof preparatory to the helical winding thereon, said inclination being such as to locate the elongated edge of the strip on a surface of revolution corresponding to the outer diameter of the wound tubing while the opposite edge of the drawn strip is disposed adjacent to the external surface of the mandrel.

16. An apparatus for producing a continuous length of cylindrical heat-insulating tubing from a strip of mineral fibers of substantially uniform width and thickness comprising:
  (a) a source of supply of said fibrous strip,
  (b) a rotary mandrel having a diameter corresponding to the internal diameter of said tubing,
  (c) means for differentially drawing said strip of fibers across the width thereof as the strip is fed to said rotary mandrel to elongate one edge portion of the strip relative to the opposite edge portion thereof,
  (d) means adjacent to said mandrel for guiding said strip around said mandrel in successive spiral convolutions; and
  (e) drawing means continuously advancing said tubing axially along said mandrel and stripping it therefrom.

17. An apparatus as set forth in claim 16 wherein the fibrous strip is permeated with a thermo-settable binding agent, and heating means for said tubing to set said binding agent prior to the stripping of the tubing from the mandrel.

18. An apparatus as set forth in claim 17 wherein said rotary mandrel is hollow and is provided with perforations, and said heating means comprises a pressurized gaseous medium connected to the interior of said mandrel for passage therefrom to the spiral strip with the binding agent permeated therethrough.

19. An apparatus as set forth in claim 16 wherein said drawing means comprises a plurality of conical rollers having their axes disposed transversely to the direction of feed of said strip and arranged to enforce a greater extent of traverse to the elongated edge portion of the strip than to the opposite edge portion thereof.

20. An apparatus as set forth in claim 19 wherein said guide means adjacent said rotary mandrel comprises at least one conical guide roller with the axis thereof disposed at an acute inclination with respect to the axis of said mandrel.

21. An apparatus as set forth in claim 19 wherein said guide means adjacent to said rotary mandrel comprises a pair of diametrally opposed conical guide rollers with the axes thereof disposed at an acute inclination with respect to the axis of the mandrel.

22. An apparatus as set forth in claim 21 including roller means adjacent to said mandrel beyond said guide means for radially pressing the outer surface of the spirally wound tubing.

23. An apparatus as set forth in claim 21 including a supply of a protective strip of material beyond said guide means, and means for winding said protective strip spirally onto the outer surface of the tubing before the latter is stripped from the mandrel.

24. An apparatus as set forth in claim 22 including a supply of a protective strip of material beyond said guide and pressing means, and means for winding said protective strip spirally onto the outer surface of the tubing before the latter is stripped from the mandrel.

25. An apparatus as set forth in claim 22 wherein the radially pressing roller means comprises a pair of diametrally opposed rollers disposed obliquely with respect to the axis of the mandrel, and each having a paraboloidal surface of revolution in contact with the outer surface of the tubing.

References Cited

UNITED STATES PATENTS

| | | | |
|---|---|---|---|
| 2,884,010 | 4/1959 | Fischer | 138—144 |
| 1,665,585 | 4/1958 | Esch | 156—494 XR |
| 3,191,289 | 6/1965 | Fleischer | 156—494 XR |
| 3,384,525 | 5/1968 | Herbert et al. | 156—494 XR |

PHILIP DIER, Primary Examiner

U.S. Cl. X.R.

138—144; 156—199, 229, 425, 459, 494; 264—119, 288